April 3, 1928.
P. K. RAASCH
COASTER WAGON
Filed April 14, 1927
1,664,641
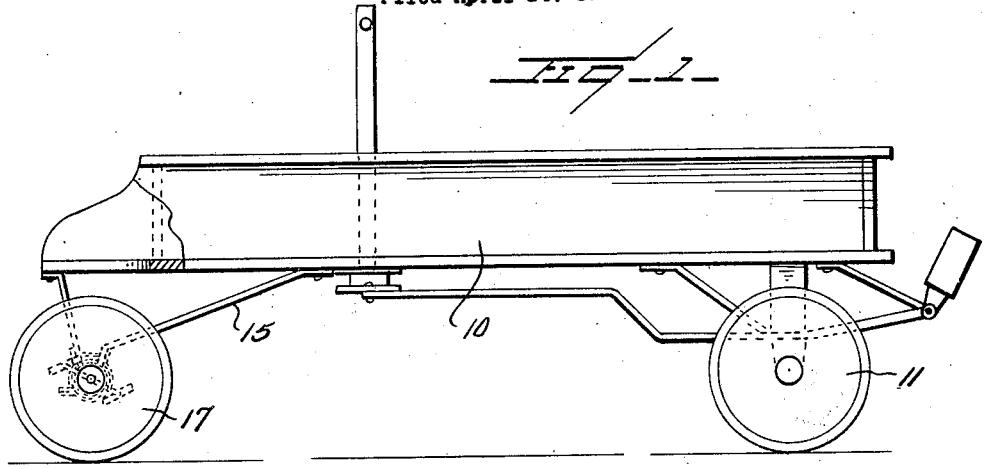
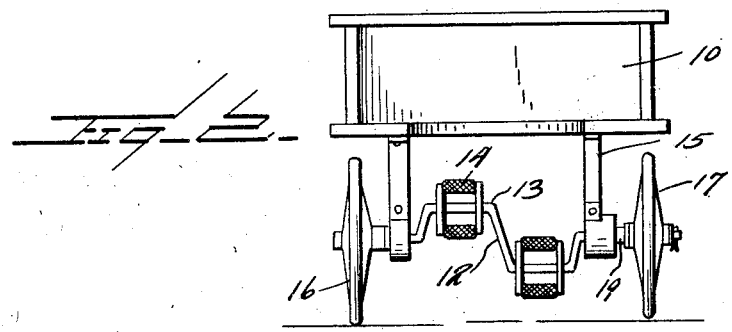
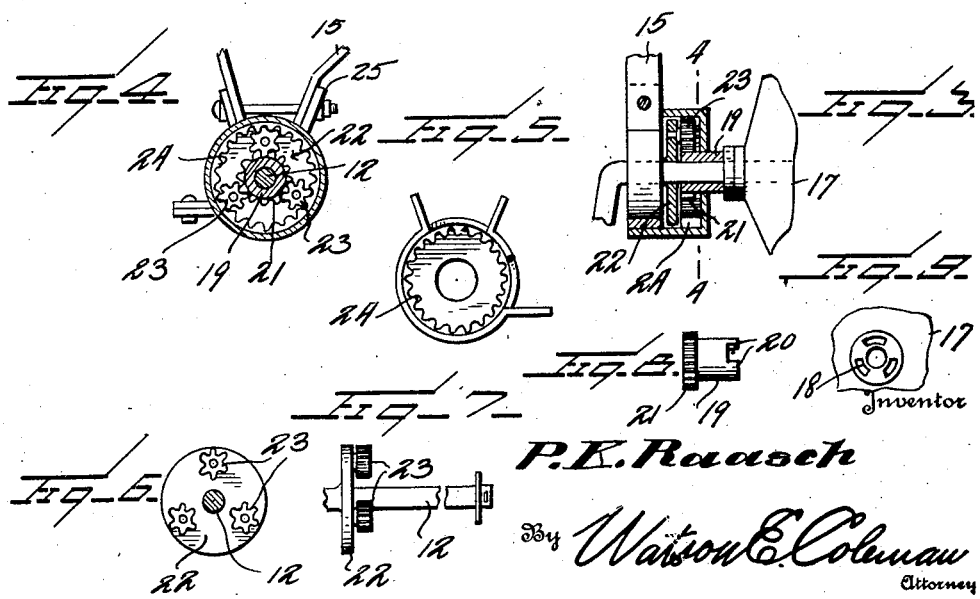
Inventor
P. K. Raasch
By Watson E. Coleman
Attorney Patented Apr. 3, 1928.

1,664,641

UNITED STATES PATENT OFFICE.

PAUL K. RAASCH, OF EAST AKRON, OHIO.

COASTER WAGON.

Application filed April 14, 1927. Serial No. 183,765.

This invention relates to coaster wagons such as are illustrated and described in my Patent No. 1,590,057 granted on June 22, 1926 and the invention particularly relates to means for driving a coaster wagon.

The general object of the invention is to provide a coaster wagon with driving means at its rear end including pedals upon which a boy or other operator may stand and drive the wagon, which pedals are so located, however, as not to cause the forward end of the wagon to be lifted.

A further object is to provide means whereby the driving wheel of the wagon may be caused to operate at a higher speed of rotation than the crank shaft upon which the pedals are mounted.

A further object is to provide means whereby a child's wagon which is ordinarily pulled or used for coasting may also be driven by pedals so that the wagon may be used for a delivery wagon as well as for entertainment, amusement and exercise.

My invention is illustrated in the accompanying drawings, wherein:—

Figure 1 is a side elevation of a wagon having driven means constructed in accordance with my invention.

Fig. 2 is a rear elevation of the wagon;
Fig. 3 is a sectional view through the power transmitting gears;

Fig. 4 is a section on the line 4—4 of Fig. 3;

Fig. 5 is an elevation of the internal gear and its casing;

Fig. 6 is an elevation of the plate 22 with its pinions;

Fig. 7 is an elevation of the axle of this plate;
Fig. 8 is a detailed elevation of the gear wheel 21 and its sleeve;

Fig. 9 is a fragmentary elevation of the hub of the driving wheel.

Referring to these drawings, 10 designates the body of the wagon and 11 the front or steering wheels thereof. These steering wheels are preferably connected to a tongue and steering mechanism of the character described in my prior patent, but I do not wish to be limited to this. Inasmuch as the means for controlling the steering wheels or for pulling the wagon have no relation to the present invention, I do not believe it is necessary to describe them. The wagon is driven by means of a rear axle 12 having cranks 13 and pedals 14. This cranked axle is mounted in bearings, in standards or supports 15 which may be of any suitable character, but which are shown in the form of castings or of wrought iron straps or braces bolted, screwed or otherwise attached to the body of the wagon and so disposed that the bearing for the axle is slightly forward of the extreme rear end of the body. The axle 12 carries at one end the freely running wheel 16 which may be of any suitable character, though illustrated as a disk wheel. The opposite wheel 17, however, is designed to be driven by the axle 12. To this end, the hub of the wheel is formed with outwardly projecting teeth 18 illustrated as three in number and mounted upon the projecting end of the axle, and freely rotatable therearound is a sleeve 19 having at one end three recesses 20 with which the teeth 18 are adapted to engage. This sleeve carries upon it the pinion gear wheel 21. Welded or otherwise attached to the axle 12 is the disk 22 carrying upon it the three pinions 23 disposed at spaced intervals and having meshing engagement with the gear wheel 21 and also with an internal gear wheel 24 which is held from rotation. This gear wheel 24 is formed with a flange or flanges 25 extending upward, as shown in Figure 4, and adapted to be bolted to the standard or support 15 so that this internal gear wheel 24 is held from rotation. It will be obvious now that the driver, standing upon the pedals 14, by alternately flexing his legs, will rotate the shaft 12 and this rotation will be communicated to the wheel 17 and that the wheels 17 will travel at a considerably higher speed of rotation than the rotation of the axle 12. The ratio may be three to one or any other desired relation depending upon the relative sizes of the gears 21, 23 and 24.

It is to be noted that the whole driving mechanism is disposed rearward of the floor of the wagon body 10 sufficiently far to permit the use of the pedals by any one standing on them. It is to be noted that the operator's weight is disposed upon the downwardly moving pedal which is disposed always in front of the axle or center of the driving wheels.

It will be seen that a wagon of this character is capable of use either by drawing the wagon or as a coaster or by driving the wagon by means of the pedals 14. While I have illustrated certain details of construction, I do not wish to be limited thereto as many minor variations may be made without departing from the spirit of the invention as defined in the appended claims.

I claim:—

1. In a child's wagon or coaster having a floor, front steering wheels, a crank shaft mounted upon the wagon at the rear thereof and rearward of the rear edge of the floor and below the body, and having pedals mounted directly upon the crank shaft whereby it may be operated, wheels mounted upon the ends of the crank shaft, and means for transmitting power from the crank shaft to said wheels.

2. The combination with a coaster wagon body having a floor and front steering wheels, of supporting means comprising rear wheels, one of which is a driving wheel, and means for driving said wheel including a crank shaft having pedals mounted directly upon the crank shaft and beneath and rearward of the rear end of the floor, the crank shaft being engaged with the driving wheel and the paths of movement described by the pedals in moving downward under power being disposed in front of the transverse axis of said rear wheels.

In testimony whereof I hereunto affix my signature.

PAUL K. RAASCH.